Aug. 6, 1946.　　　O. G. MANDT　　　2,405,312
LOADING MACHINE
Filed June 3, 1944　　　5 Sheets-Sheet 5

Inventor
Obert G. Mandt

Patented Aug. 6, 1946

2,405,312

UNITED STATES PATENT OFFICE 2,405,312

LOADING MACHINE

Obert G. Mandt, Upper Arlington, Ohio, assignor to The Jaeger Machine Company, Columbus, Ohio, a corporation of Ohio Application June 3, 1944, Serial No. 538,640

2 Claims. (Cl. 214—112)

This invention relates to loading machines, having particular reference to a loading machine of the type employing a portable engine-propelled base upon which is mounted an upstanding mast, and wherein use is made of power-actuated cables, trained over or along the mast, for effecting the raising and lowering of an associated material-handling loader.

Loading machines of this category are used quite widely in operations requiring the transfer of materials, such as sand, gravel, ores, coal, boxes or the like, from, for example, positions of deposit on the ground to relatively elevated positions of discharge suitable for their deposit on the bodies of automotive truck vehicles, rail cars or the like.

One of the objects of the invention is to provide an improved loading machine of this character wherein the mast is mounted on the portable base for turning movement about a substantially vertically disposed axis, so that the associated scoop or other load-handling element, when in its elevated position, may turn in unison with the mast, in order that materials carried thereby may be discharged advantageously laterally to either side of the machine following predetermined lifting thereof to an elevated plane above the ground or other base surface.

It is another object of the invention to provide a loading machine for the uses indicated characterized by the simplicity of its mechanical construction, the ease by which its operation may be governed, and its sturdy features of design by which the same is well adapted for hard usage and extended service.

For a further understanding of the invention, reference is to be had to the following description and the accompanying drawings, wherein.

Figure 1:
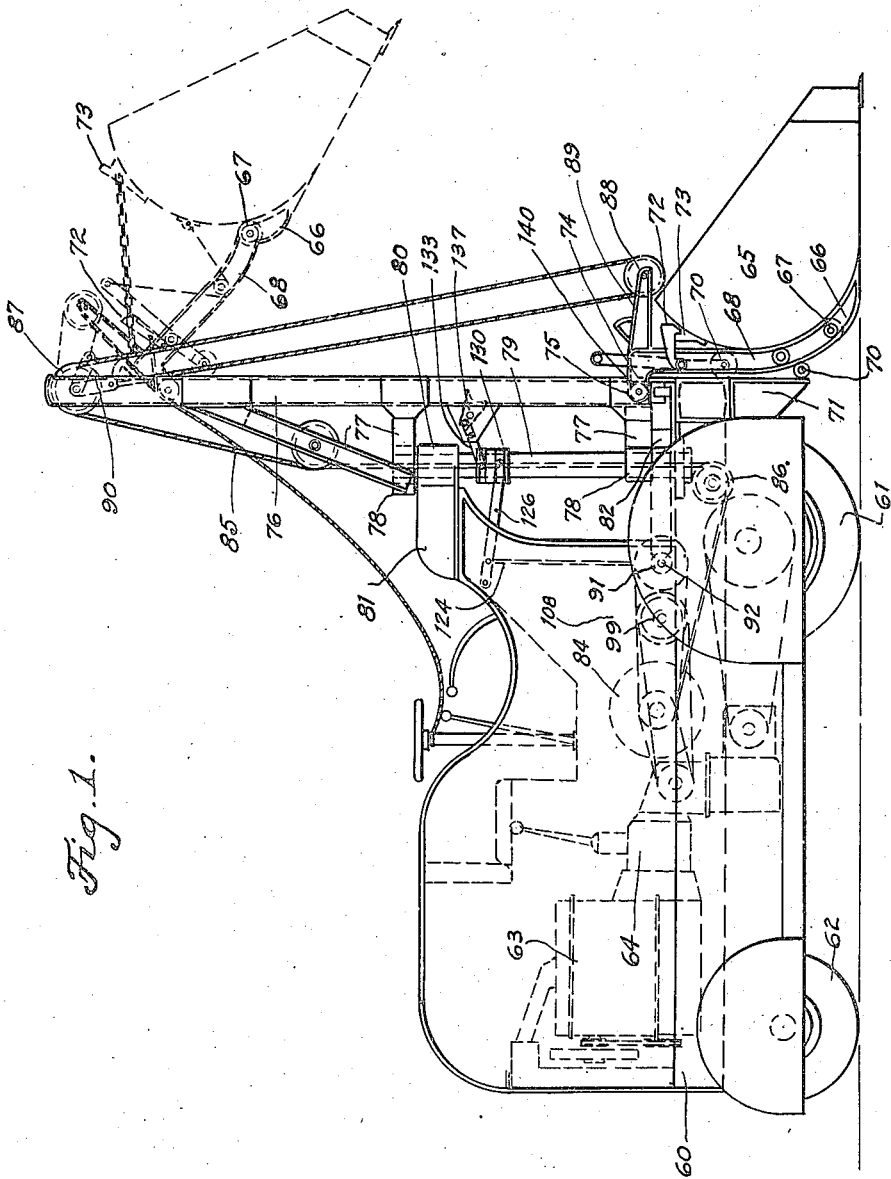
Fig. 1 is a side elevational view of a loading machine formed in accordance with the present invention, the material-handling scoop of the machine being shown in full lines in its lowered position and in broken lines in its elevated position of discharge.
Figure 2:
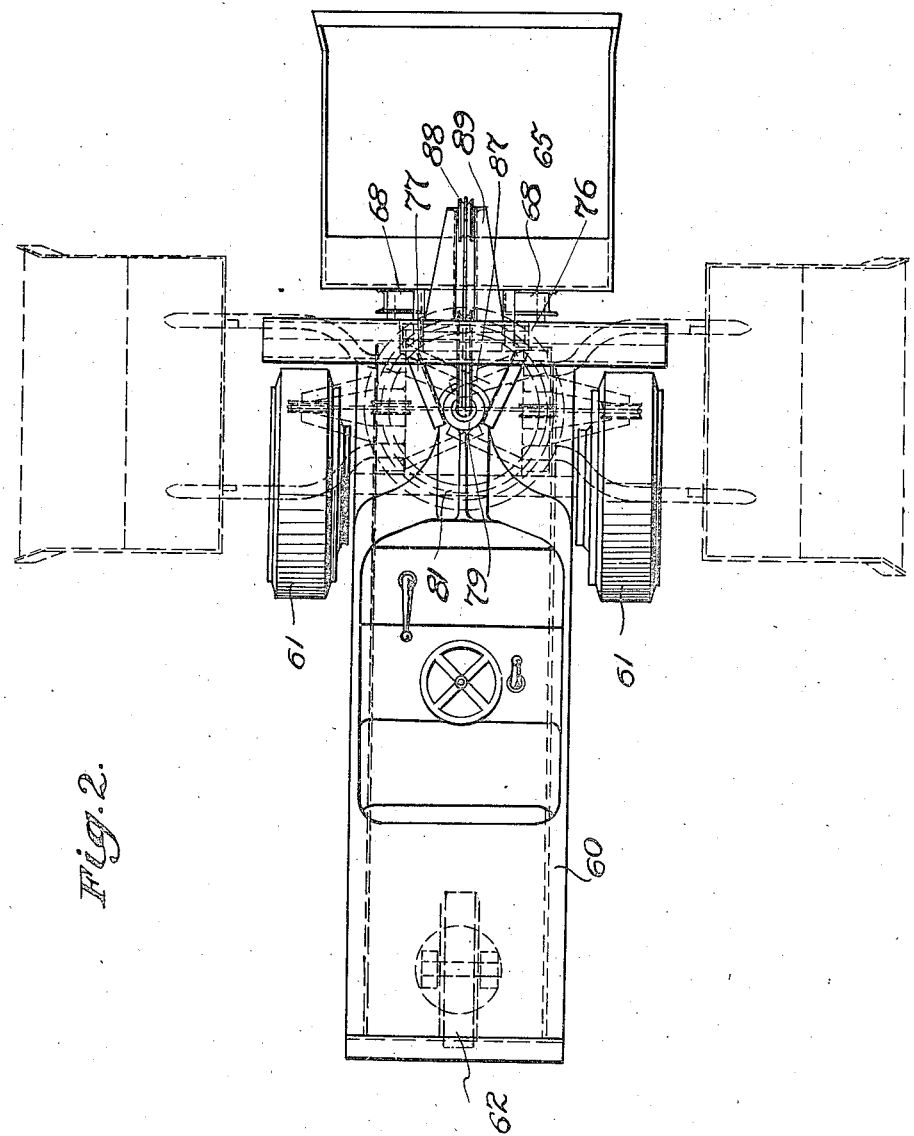
Fig. 2 is a top plan view of the loading machine, illustrating in full lines the position of the scoop during loading thereof, and in broken lines, the discharge positions which the scoop may assume in delivering materials handled thereby to associated carriers.
Figure 3:
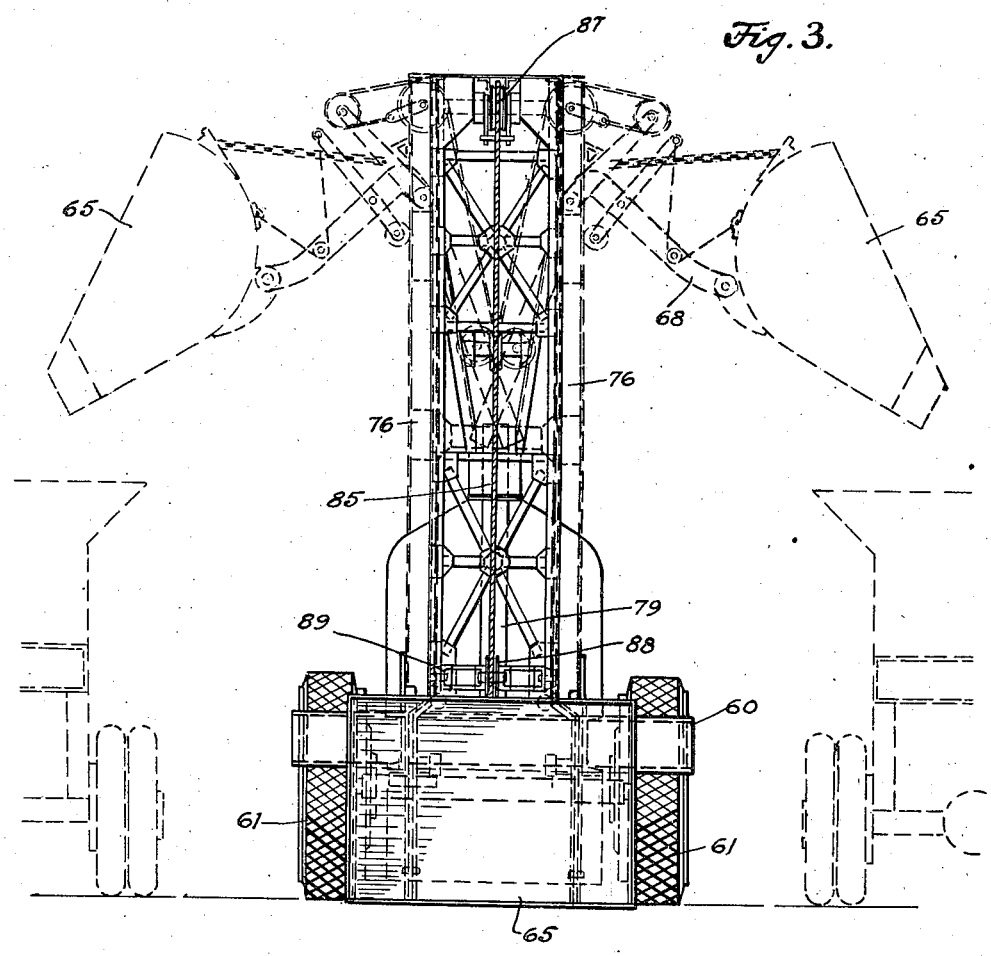
Fig. 3 is a front elevational view of the loading machine, disclosing the scoop in dotted lines in various material-discharging positions.

My improved loading machine may be constructed to embody a portable base 60, having a pair of forwardly located, motor driven, traction wheels 61 and a single rearwardly disposed ground-engaging steering wheel 62. Carried by the base or frame 60 at its rear end is an internal combustion engine, or other power plant 63, having the usual clutch and change-speed transmission 64.

Figure 4:
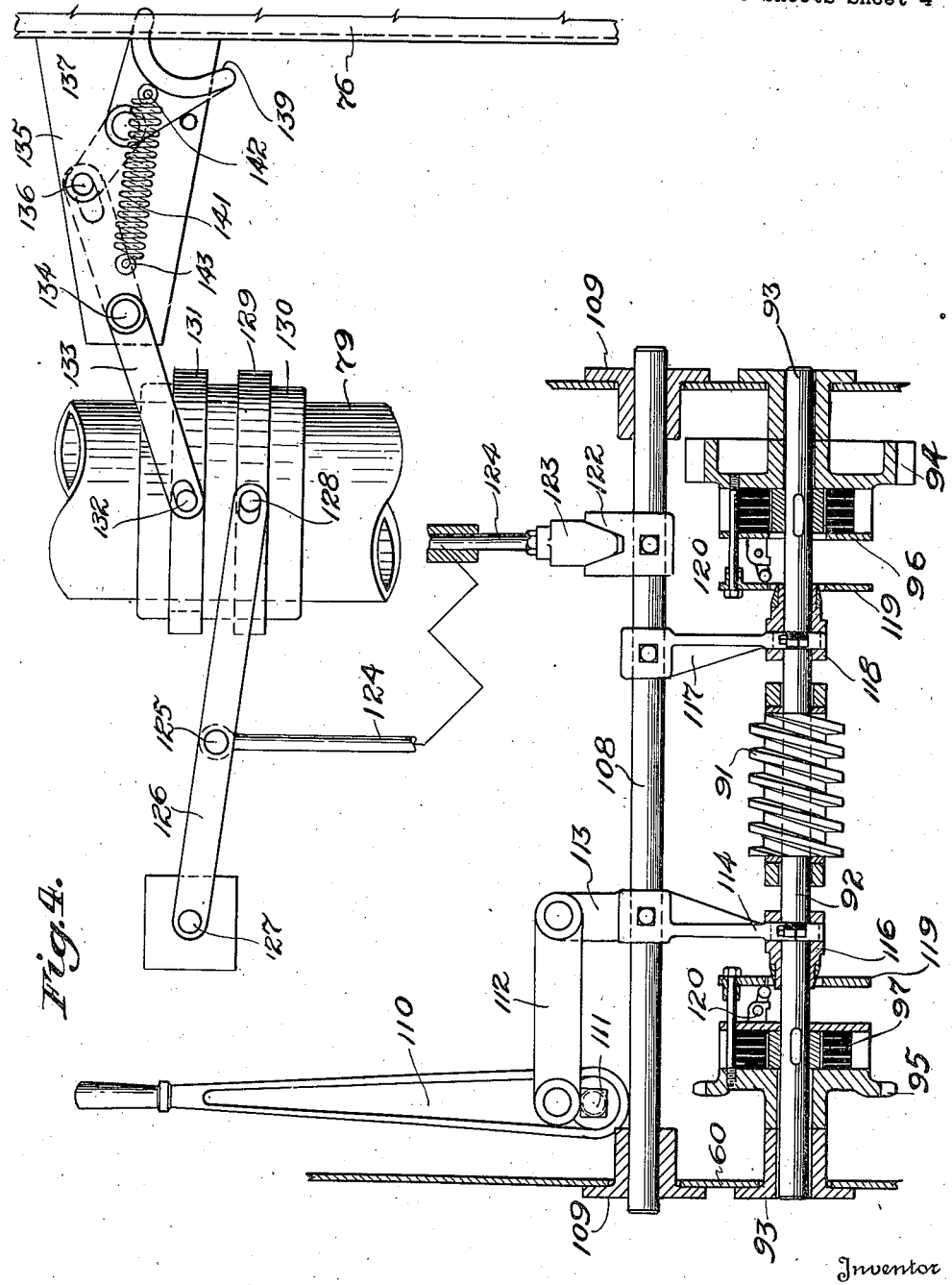
Fig. 4 is a vertical transverse sectional view, partly in elevation, disclosing the drive mechanism for rotating the turnable mast.
Figure 5:
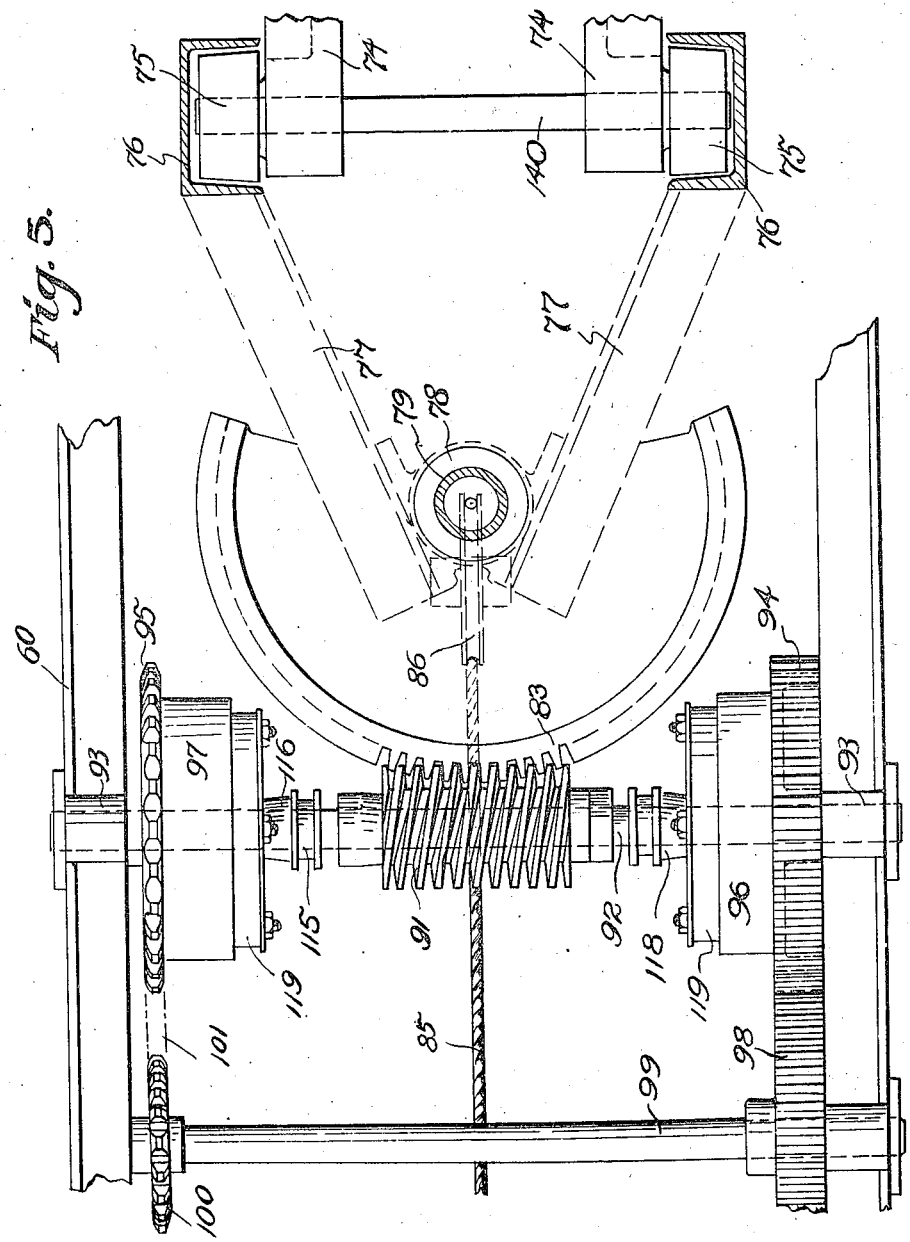
Fig. 5 is a horizontal sectional view taken through the mast and disclosing its rotating mechanism.

At the front of this machine, there is provided a material-receiving scoop or bucket 65, the latter being provided at the rear thereof with a bracket 66 to which is pivotally united as at 67 a pair of carrier arms 68. These arms conform to the curvature of the rear wall 69 of the scoop or bucket 65, so that when the latter occupies its lowered position, as illustrated in Fig. 4 of the drawings, forward advance of the machine to effect penetration of the scoop or bucket into the pile of material to be gathered, will produce thrusts which will be transmitted to the arms. These arms in turn engage the thrust-receiving rollers 70 carried by a bracket 71 depending stationarily from the frame of the base 60.

Also, carried by the arms 68 are pivoted latch detents 72, the hook-shaped outer ends of which are adapted for engagement with keepers 73 stationarily fastened to the upper portions of the rear walls 69 of the scoop or bucket. While the detents are in engagement with the keeper 73, the bottom of the scoop or bucket is maintained in a substantially horizontal plane, as it is when penetrating the material to be lifted or during the elevation of the material to a position of discharge. When the bucket or scoop has been elevated to such a discharge position, as shown by dotted lines in Fig. 4, the detents are rocked about their pivotal mounting on the arms 68, by any suitable manual control, so that the scoop or bucket may tilt about its pivotal connection 67 with the arm 68 to effect gravitational discharge of the materials contained therein.

The upper ends of the arms 68 terminate in laterally directed portions 74, which carry rollers 75 arranged for vertical movement in a pair of relatively spaced upstanding channel members 76. Joined with these members are rearwardly converging struts 77, the latter having their inner ends secured to vertically registering collars 78, which are fastened to the upper and lower ends of a rotatable tubular column 79. This column at its upper end is mounted for rotation within a bearing 80 provided in a frame-carried bracket 81 and at its lower end is connected with a wheel 82 formed peripherally with gear teeth 83 and mounted for rotation on the base frame 60.

Also mounted on the frame 60 is a drum or windlass 84 to which is fastened one end of a scoop raising and lowering cable 85. From the drum 84, the cable 85 is trained over a frame-mounted guide 86, the cable then passing upwardly through the interior of the column 79, and is trained over a sheave 87 rotatably carried at the top of the channel members 76 of the mast. From the sheave 87, the cable 85 is trained downwardly and passes over a second sheave 88 carried by the outer ends of a pair of extensions 89 provided on the carrier arms 68. From the sheave 88, the cable extends upwardly and is fastened to or dead-ended on a link 90 which is pivotally carried by the shaft supporting the upper sheave 87. The drum or windlass 84 is driven in any suitable manner by power derived from the engine 63, and consideration will disclose that when the drum is rotated in a direction to shorten the effective length of the cable, the carrier frame arms will be elevated and caused to move vertically in a guided manner between and by the channel members 76 carrying with them the scoop or bucket 65 and the materials loaded within the latter. When the scoop or bucket reaches its desired position of elevation as, for example, to permit of the discharge of its contents into the body of a truck or other carrier, as shown, in dotted lines in Fig. 6, the detents 72 are rocked to remove the same from latching engagement with the keeper 73.

Since the scoop or bucket is pivoted to the arms 68 in an off-center position, the lifting of the detents will cause said scoop or bucket to partially rotate about its pivotal connection 67 with the arms 68, thus enabling the bottom of the scoop or bucket to assume an angular position providing for the gravitational discharge of the materials handled thereby, in order that such materials may be deposited within the bodies of associated carrier vehicles.

To turn the mast or boom about the vertical axis of the column 79, the gear teeth 83 of the wheel 82 mesh with a worm 91, which is fixed on a cross shaft 92, the latter having its ends journaled in frame carried bearings 93. Loosely mounted on the shaft 92 at one end is a gear 94, and likewise loosely mounted on the shaft 92 at its other end is a sprocket 95. Joined with the gear 94 and the sprocket 95 are disk clutches 96 and 97, respectively, half of the disks of each clutch being fixed for rotation with the shaft 92 and the remaining alternate disks fixed for rotation with the housings of the clutches 96 and 97. The gear 94 is disposed in mesh with a complemental gear 98 fixed for rotation on a countershaft 99, the latter being suitably driven in one direction by power derived from the engine 63. Also fixed for rotation on the shaft 99 is a sprocket 100, around which passes an endless chain 101. By this arrangement, it will be seen that the shaft 99 serves to rotate the gear 94 in one direction and the sprocket 95 in the opposite direction. Therefore, by selectively actuating the clutches 96 and 97, the cross shaft 92 may be rotated in a direction to produce the desired rotation of the wheel 82 and the column 79 of the mast, so that the bucket or shovel will be swung to one side or the other of the center line of the machine.

Conveniently the operation of the clutches 96 and 97 may be governed by the provision of a sliding clutch actuating shaft 108, which is slidably supported in bearings 109 carried by the base frame 60. The shaft 108 may be shifted by means of a manually operated lever 110, which is fulcrumed as at 111 on the frame 60. The lever has pivoted thereto one end of a link 112, the opposite end of said link being connected with a shifter bracket 113, which is fixed to the clutch shaft 108. The bracket 113 includes a depending yoke 114, the lower portion of which is received within an annular groove 115 provided in a collar 116, loosely mounted on the worm shaft 92.

A similar shifter yoke 117 is carried by the clutch shaft 108 and engages with a collar 118 slidably mounted on the shaft 92 and adapted for engagement with the clutch 96. Each of the clutches 96 and 97 is provided with a pressure plate 119, which engages pivoted pressure pawls 120 of the clutches 96 and 97. The collars 116 and 118 are formed with tapered ends which enter openings provided in pressure-applying disks 121 of said clutches. By these means, the worm shaft may be rotated in a direction to obtain the desired rotation of the mast or boom assembly about its vertical axis.

To prevent the mast or boom from being rotated about its vertical axis until the bucket or scoop has been sufficiently elevated so that it will assume a horizontal plane above the frame mounted elements of the machine, the clutch shaft 108 is provided with a fixed socket member 122, with which is engaged the lower headed end 123 of a vertically extending link 124. The upper end of this link is pivotally connected as at 125 to an arm 126. This arm is pivoted as at 127 on the frame of the machine and has its outer bifurcated end slotted to receive pins 128 projecting from a ring 129, the latter being received within an annular groove provided in a vertically shiftable collar 130, which is mounted on the tubular column 79. The collar 130 is formed with a second annular groove in which is positioned a second ring 131, the latter being provided with pins 132 which are receivable in slots provided in the outer bifurcated end of a lever 133. This lever is pivoted as at 134 intermediately of its length on a bracket 135 carried by the channel members 76. The inner end of the lever 133 is slotted to receive a pin 136 formed on a pivoted detent 137, also carried by the bracket 135. The inner end of the detent 137 is provided with a semicircular socket 139 which is adapted for engagement with a cross axle 140 on which the rollers 75 are carried. A coil spring 141 is fastened at one end as at 142 to the detent 137, the other end of the coil spring being secured as at 143 to the bracket 135, the spring being disposed in an off center relation with respect to the detent in order to positively maintain the latter in one position or the other of its pivotal movement.

It will be seen that when the scoop or bucket 65 is elevated, the cross axle 140 will enter the socketed end of the detent 137, rocking the detent about its pivot and causing the elevation of the collar 130 and the lifting of the link 124 so that its headed end will be removed from engagement with the socket member 142, thus permitting the clutch shaft 108 to be manually actuated to control the direction of rotation of the worm shaft 92. When the scoop or bucket is lowered, the reverse of this operation takes place, and the link 124 is lowered to assume the full line position disclosed in Fig. 7.

In view of the foregoing, it will be seen that the present invention provides an improved loading machine for use in many industrial capacities where bulk materials of various kinds are required to be elevated or transferred from one location to another. A particular advantage which my improved machine possesses over prior machines for similar purposes resides in constructing the mast or boom so that, in addition to supporting the associated shovel, scoop or material receiver for elevation in a vertical direction, it may be revolved about a substantially vertical axis to locate the receiver laterally of the machine when material is to be discharged therefrom. This feature provides for greater facility in the operation of the machine and reduces the maneuvering of the portable base, as is usually necessary in locating the receiver with respect to associated vehicles or in other positions of discharge. The power-driven turning mechanism for the mast or boom is so controlled that it is locked against horizontal swinging movement when the receiver is in its lowered position, where if swung laterally, it might strike or injure stationary elements on the portable self-propelled base, thus protecting the machine against improper operation. My improved machine is further characterized by its mechanical simplicity and its ability to receive and handle heavy loads expeditiously and with complete control thereover.

I claim:

1. Portable load-handling mechanism comprising a base, a tubular column arising from said base, a vertical mast structure joined with said column for turning movement about the vertical axis thereof, a carrier frame mounted for vertical guided travel on said mast structure, a receiver for materials to be loaded connected with said carrier frame, normally locked clutch controlled power-driven means for imparting turning movement to said mast structure in either direction from a centered position, an independently controlled power-driven drum on said base, cable means connected with said drum and passing through said column and over said mast structure for association with said carrier frame to impart controlled raising and lowering movement thereto, and means operative automatically following predetermined elevation of said carrier frame on said mast structure to unlock the mast-turning means, thereby rendering the same operative to impart controlled turning movement to the mast structure.

2. Portable load-handling mechanism comprising a base, a mast structure arising from said base, bearings carried by said base with which said mast structure is joined for turning movement about a substantially vertical axis, a load receiver, a carrier member for said receiver associated with said mast structure for guided vertical movement with respect thereto, a cable drum mounted on said base, normally locked reversible power-driven means on said base for imparting turning movement to said mast structure, carrier frame and load receiver in either direction from a central position, independently controllable power-driven means on said base for rotating said drum, a cable connected at one end with said drum and having intermediate portions thereof trained over said mast structure for raising and lowering engagement with said carrier member, and means operative automatically following predetermined elevation of said carrier members to release said reversible power-driven means to admit of turning movement of said mast structure.

OBERT G. MANDT.